US006022219A

United States Patent [19]

Cohen

[11] Patent Number: 6,022,219

[45] Date of Patent: Feb. 8, 2000

[54] PAINTING KIT AND RELATED METHOD

[76] Inventor: Elise Cohen, 814 West Bleeker, Unit C-3, Aspen, Colo. 81611

[21] Appl. No.: 09/216,638

[22] Filed: Dec. 18, 1998

[51] Int. Cl.[7] .......... G09B 11/10

[52] U.S. Cl. .......... 434/84; 434/81

[58] Field of Search .......... 434/81, 84, 88, 434/96, 98

[56] References Cited

U.S. PATENT DOCUMENTS

| | | | |
|---|---|---|---|
| 1,205,779 | 11/1916 | Peck | 434/84 X |
| 1,901,861 | 3/1933 | Baker | 434/84 X |
| 2,932,906 | 4/1960 | Chamberlin | 434/84 |
| 3,604,558 | 9/1971 | Frerebeau | 434/84 X |
| 3,768,177 | 10/1973 | Thomas | 434/81 |
| 4,604,062 | 8/1986 | Woods | 434/81 X |
| 4,696,400 | 9/1987 | Warman | 434/88 X |
| 5,772,247 | 6/1998 | Legrand | 434/84 X |

OTHER PUBLICATIONS

My Hands™—Complete Handprint Poem Kit product information, source unknown, at least as early as Dec. 18, 1998.

My Hands™—Complete Handprint Poem Kit, *One Step Ahead*, Preferred Issue 1999, p. 39.

*Primary Examiner*—Sam Rimell

*Attorney, Agent, or Firm*—Holland & Hart LLP

[57] ABSTRACT

A unique painting process and an associated kit including the materials required for practicing the method. The method includes the acts of preparing a protective covering on a work surface, preparing a background media by placing it on the protective covering on the work surface, placing a reservoir on the protective covering, filling the reservoir with a paint, dipping the posterior of the infant in the paint, and stamping the posterior on the background media to create stamping prints. The kit of the present invention includes a flat, flexible backing piece, a protective cover folded into a compact size attached to the backing piece, a plurality of paint bottles attached to the backing piece, a plurality of reservoirs attached to the backing piece, a plurality of painting tools attached to the backing piece, and a plastic cover having a periphery, the plastic cover positioned over the protective cover, plurality of paint bottles, plurality of reservoirs, and plurality of paint brushes, and attached around its peripheral edge to the backing piece.

17 Claims, 5 Drawing Sheets

PAINTING KIT AND RELATED METHOD

FIELD OF THE INVENTION

This invention relates to a painting kit and the associated method for its use. More particularly, this invention relates to a pre-packaged painting kit for use in association with an infant's posterior to create highly stylistic designs on a surface suitable for display.

BACKGROUND OF THE INVENTION

The addition of a newborn infant to a family inspires feelings of nostalgia and the related desire to create a lasting remembrance of the child's infancy. There are many ways to create this lasting remembrance, including bronzing a baby shoe, photography, videography, and making hand and feet prints. These types of products satisfy the need of a remembrance, but are all either utilitarian or unfinished in nature, and are very recognizable as mementos.

The existing types of remembrances are easily recognizable as just that—a whole or part of a baby or infant used to create a lasting impression. There is no known kit available, or method associated therewith, to assist in creating a remembrance that results in a fine art end product which is not easily recognized as merely a remembrance.

It is with these goals in mind that the instant invention was created.

SUMMARY OF THE INVENTION

The present invention relates to a unique painting process and a painting kit used to practice the process. The process includes the preparation of a protective covering on a work surface, placing a background media to be painted on the protective covering, placing a reservoir on the protective covering, filling the reservoir with paint, dipping the posterior of the infant in the paint, and stamping the painted posterior on the background media to create a finished product.

The kit of the present invention includes a flat, flexible backing piece (such as cardboard), a protective cover folded into a compact size and positioned on the backing piece, a plurality of paint bottles positioned on the backing piece, a plurality of reservoirs positioned on the backing piece, a plurality of painting tools positioned on the backing piece, and a transparent plastic sheet covering the protective cover and plurality of paint bottles, reservoirs and painting tools, and attached around its peripheral edge to the backing piece. In more detail, a background media portion can also be included on the backing piece and under the plastic covering.

Other aspects, features and details of the present invention can be more completely understood by reference to the following detailed description of a preferred embodiment, taken in conjunction with the drawings, and from appended claims.

BRIEF DESCRIPTION OF THE DRAWINGS

The file of this patent contains at least one photograph executed in color. Copies of this patent with color photograph will be provided by the Patent and Trademark Office upon request and payment of the necessary fee.

DETAILED DESCRIPTION OF THE PREFERRED EMBODIMENT OF THE INVENTION

The present invention is directed at a method of creating unique and distinctive products in which paint is applied to the posterior of an infant and an impression of the infant's posterior is made upon a prepared surface by stamping the painted posterior on the prepared surface. In a preferred embodiment of the product created with the method of the present invention, the prepared surface or background media is a sheet of poster board onto which multiple impressions of the infant's posterior are stamped to create an abstract work of art. In an alternative embodiment, the prepared surface is a t-shirt onto which one or more impressions of the infant's posterior are placed. Preferably, articles used to practice the method of the present invention are packaged in a kit, for convenient use.

Figure 1:
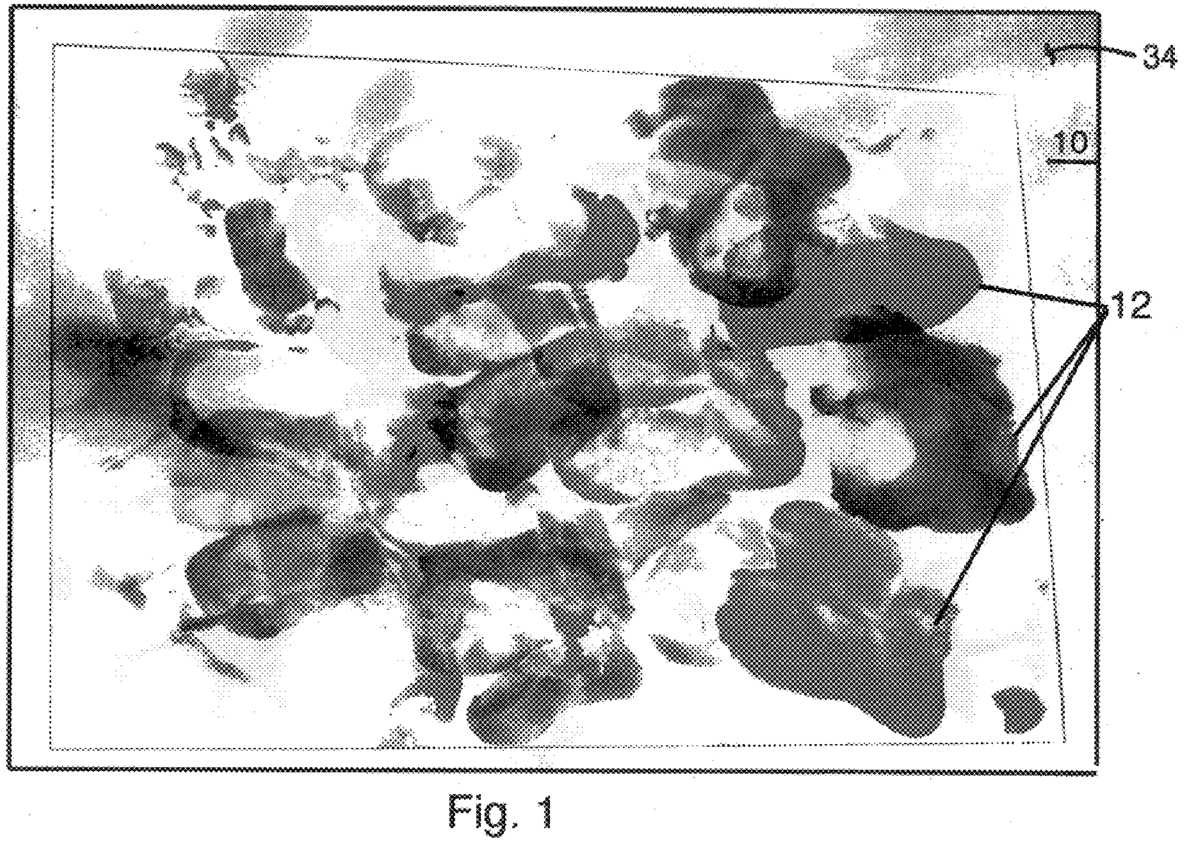
FIG. 1 is a color photograph of a finished product obtained by practicing the present invention.

A painting 10 made by practicing the method of the present invention is shown in FIG. 1. Painting 10 consists of individual impressions 12 of an infant's posterior arranged in an abstract design, with each impression being generally heart-shaped. A plurality of impressions are made by applying paint to an infant's posterior and "stamping" the painted posterior onto a prepared surface (or background media). It may be appreciated that the orientation of each individual impression is selected to obtain a desired end result. If desired, other elements may be added to the painting using a paint brush or other implement.

Figure 2:
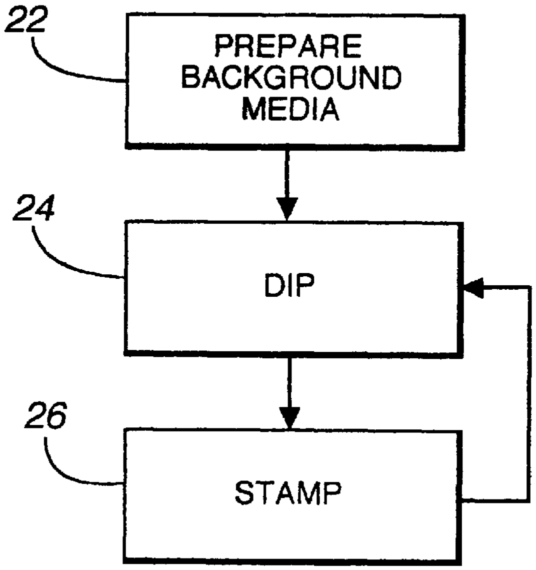
FIG. 2 is a flow chart representing the steps of the method of the present invention.
Figure 3:
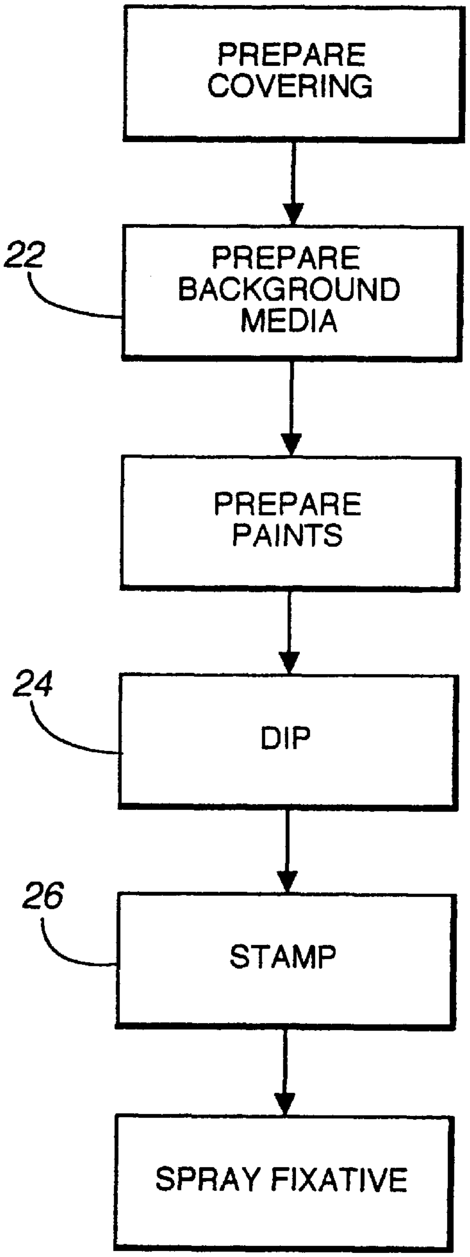
FIG. 3 is a flow chart of an alternative embodiment of the method of practicing the present invention resulting in a finished product like that shown in FIG. 1.

More particularly, unique products are created in accordance with the method steps shown in FIG. 2, by first preparing a surface (step 22), dipping the posterior of an infant in a shallow reservoir of paint (step 24), and stamping the paint-covered posterior on the surface (step 26). The dipping and stamping steps 24 and 26 are repeated several times until the desired density, placement and color combination of impressions are made. Most preferably, the infant is at most six months old. Six months of age or younger is preferable because the infant is not too active and can be handled more easily than an older infant. A more detailed method is shown in FIG. 3, and includes the steps of preparing the covering, preparing the background media, preparing the paints, dipping the posterior of the infant, stamping the posterior of the infant on the background media, and after drying, spraying the fixative on the paint. The steps of dipping and stamping can be repeated as often as desired, with the optional step of cleaning the infant's posterior when changing paint colors.

Figure 4:
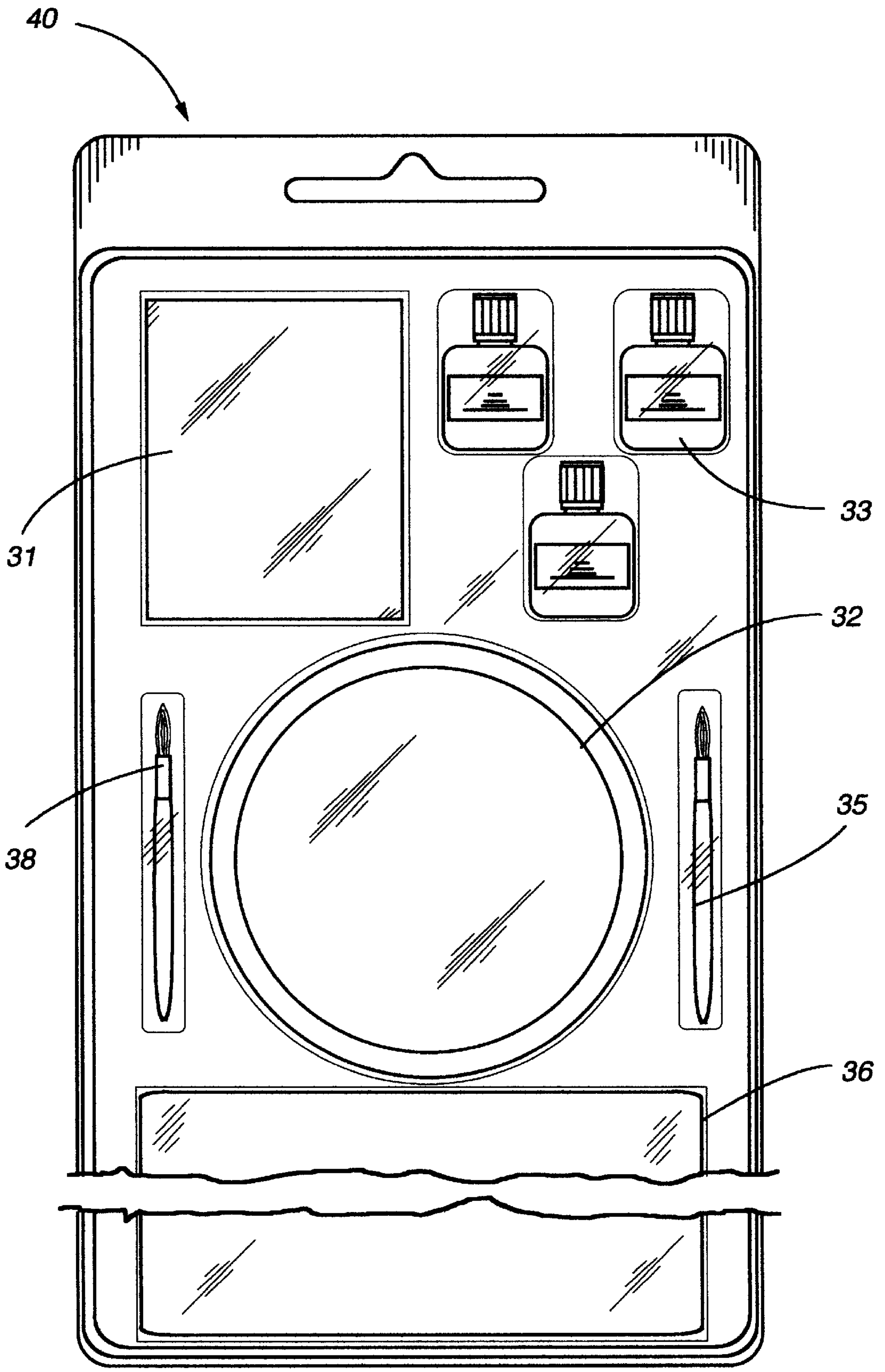
FIG. 4 is a plan view of a painting kit of the present invention with which the method of FIGS. 2 and 3 may be practiced.
Figure 5:
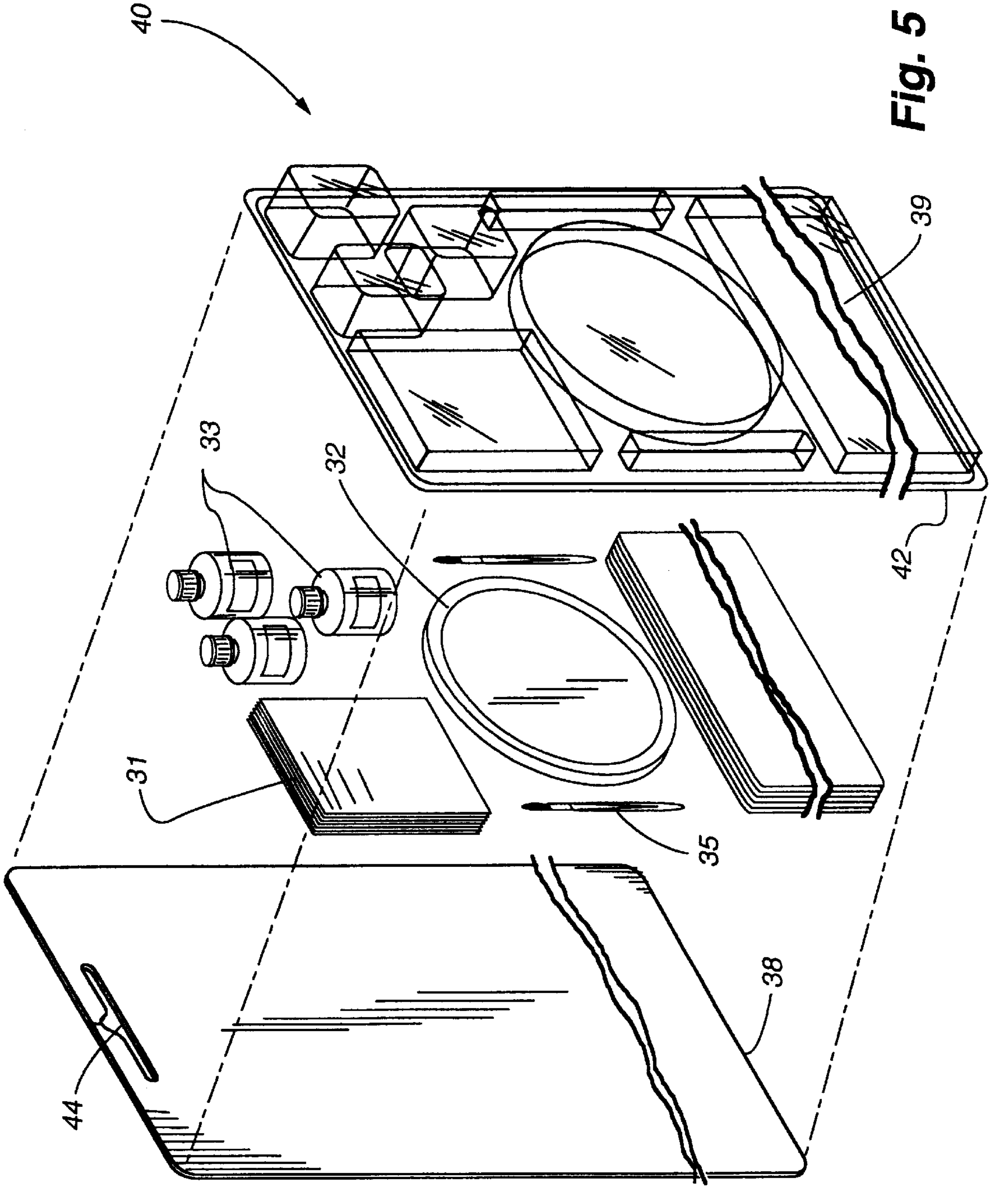
FIG. 5 is an exploded view of the painting kit shown in FIG. 4.

Referring now to FIGS. 4 and 5, when practicing the method of the present invention, it is desirable to utilize a plastic, paper or cloth protective covering 31, preferably approximately 4'×4', to protect the floor, carpet or other work surface from paint. Protective covering 31 can be larger or smaller depending on the work surface on which the method is performed. While a plastic covering is preferred, butcher paper is also acceptable. Newspaper can be used but is not preferred, because it increases the chances of smudging any final work product.

The method of the present invention is most preferably practiced with at least one shallow reservoir 32 containing paint into which the infant's posterior is dipped. While reservoir 32 may be a bowl, pie tin, baking pan or plate-shaped reservoir, most preferably reservoir 32 is a plastic plate of approximately 10¼ to 10 ⅜" in diameter. Although plastic plates are preferred, paper plates can also be used. Plate shaped reservoirs 32 are preferred because the paint easily spreads in a consistently thin layer over the surface of the plate, with the circumferential upper extending lip of the plate maintaining the paint inside the plate. However, the lip of such plates do not extend so high as to interfere with the application of the paint to the infant's posterior during dipping. More than one reservoir 32 should be used if a plurality of different colored impressions are to be made.

Finger paints 33, especially non-toxic brands such as Palmer paints, Crayola, or Rich Art, are preferred.

The surface 34 (FIG. 1) to be painted is preferably poster board at least ¼" thick. While thinner poster board or other surface could be used, it has been found that poster board having the ¼" thickness is sufficiently rigid to withstand the stamping process, is easily manipulated, thereby reducing smudging, and may be matted and framed, if desired. White or off-white poster board is preferable since it allows virtually any color combination of paint. Colored poster board can also be used if desired. The size of the background media has no limitation other than what is practicable. It has been found that 20"×30" sheets of poster board, which are readily available in most stores, are easily handled and may be framed.

A painting tool 35, such as a small paint brush or a small poly-brush (artist's) sponge on a stick handle, may be used to spread or mix paint on the plate. One brush or sponge should be available for each color of paint. Preferably, if a poly-brush sponge is used, the sponge should have a size of approximately 1"×2" or 2"×2".

Further, it is advantageous to have cleaning materials available, such as baby wipes available under the brand name Chubs or Huggies. A clean, dry diaper should also be available.

The method of the present invention may be practiced on any large flat surface, such as a floor or table where the background media can be fully supported in a flat, horizontal manner and all sides easily accessed. Initially, the work area is covered is covered with protective covering 31. Background media 34 is then centered on protective covering 31. Positioning background media 34 in the center of protective covering 31 helps minimize the splattering of paint onto the work surface.

The painting materials are then prepared. First, reservoirs 32, such as paper plates, are positioned on protective covering 31 . Reservoirs 32 serve as a palate for paints 33, and one paper plate should be used for each color. Next, paint 33 is poured into reservoirs 32 to a depth 1⁄16" to ⅛". Filling reservoirs 32 with paint 33 over ⅛" deep results is an unnecessarily messy process, while underfilling reservoirs 32 with paint 33 below 1⁄16" deep does not allow for repeated dipping and stamping. Paint 33 may be distributed evenly in reservoirs 32 with a small paint brush 35 or artist's sponge.

The infant's posterior is then dipped into a reservoir 32 and covered with paint 33. It is desirable to roll the infant slightly for good coverage. There are two different ways to hold the infant to obtain desirable dipping results. If the infant has good head and neck control, the infant can be positioned facing away from the adult, who securely grasps each of the infant's thighs with one hand, gently pressing the thighs together. The infant's body should rest against the forearms and elbows of the adult. The posterior of the infant can then be dipped into the reservoir. If the infant does not have good neck and head control, then the infant's head and neck should be supported with one hand, while placing the other hand under the infant's thighs. In this position, the infant's posterior is dipped into the reservoir and covered with paint.

The painted posterior is then stamped or pressed on the background media 34. It is preferable to roll the infant's posterior slightly when in contact with the background media to create a clear print 12 . If the infant is held in the first manner described above, the infant is rolled gently forward, away from the adult, for an optimal print. If the infant is held in the second manner described above, an optimal posterior print is obtained by rolling the infant either forward or side to side, depending on the orientation of the infant with respect to the adult.

The posterior of the baby is then cleaned with a wipe. Thereafter, the dipping, stamping and cleaning steps may be repeated to obtain a desired result. It can be readily appreciated that the prints can be placed in a random or regular pattern. For example, all prints may be oriented in one direction. The prints may appear to be hearts, flowers, other objects or an abstract design.

It is not necessary to let one color or stamp dry before proceeding to the next color stamp. The bleeding of one color into another can be part of the effect of the end result. If a runny look is desired, then the reservoir should be filled to a greater depth with paint. If a splotchy effect is desired, less paint should be placed in the reservoir.

Optionally, the printed product may be treated with a fixative agent in preferably spray form. A suitable fixative agent is a no odor matte fixative offered under the trade name Blair. The fixative sets the paint after drying.

Figure 6:
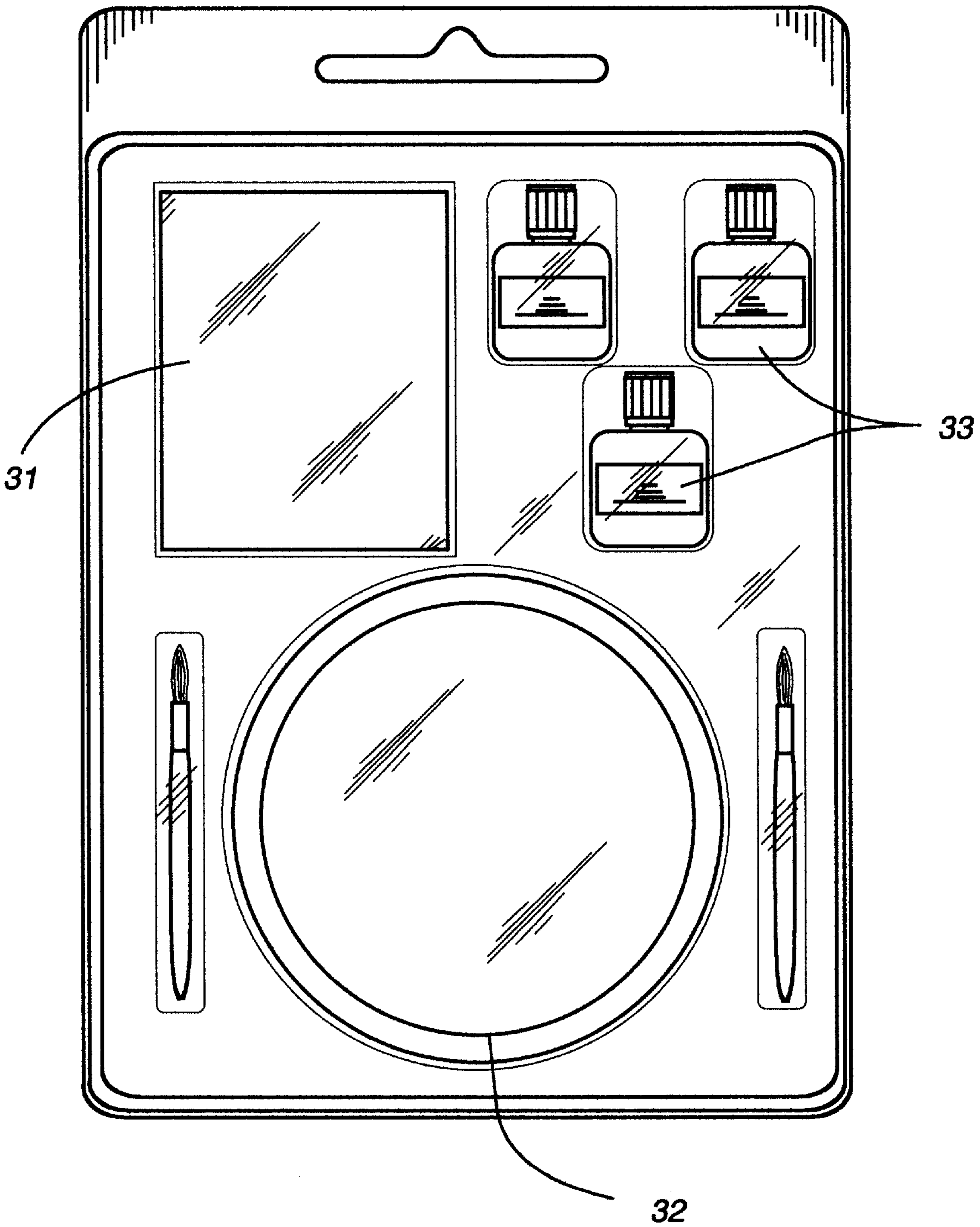
FIG. 6 is a plan view of an alternative embodiment of a painting kit of the present invention.

Materials for practicing the method of the presented are presented in kit form, as shown in FIGS. 4, 5 and 6. The preferred kit 40 shown in FIGS. 4 and 5 a plastic sheet floor covering 31, a plurality of plate reservoirs 32 to hold the paint 33, a plurality of paint colors 33 for use, and a painting tool 35, such as a paint brush, one for each plate. Alternatively, the paint brush could be replaced with the poly-sponge, or a combination of paint brushes or poly-sponges could be included. A section of background media 36, such as poster board, is also included in the kit.

The package 40 for holding each of the materials to form the kit can include a blister pack, which has a cardboard, flexible backing piece 38 with instructions and illustrations on the back side thereof, and the required materials denoted above positioned on and attached to the front side of the backing piece. The materials are secured to backing piece 38 either by a shaped-conforming or rectangular plastic cover 39 fixed around its perimeter edge to the backing piece, such as by an adhesive material or staples. Plastic cover 39 is clear and allows the potential purchaser to view each of the materials easily. Advertisements and other information can be positioned on the plastic cover or the front surface of the backing piece. Backing piece 38 can have any shape, but is preferably rectangular. A hanging hole 41 having an elongated laterally extending slot with a bite formed in its upper edge is found on the top edge of backing piece 38.

The orientation of the materials in package 40 is important for drawing the attention of the potential purchaser, and also for the efficient use of space, which reduces costs and increases density of packing on shelves. Preferably, in the top row of the package protective cover 31 is folded and positioned on the left portion of the top row, as shown in FIG. 4, and the plurality of paint bottles 33 are aligned in the right portion of the top row. Any number of paint bottles 33 could be included, however, preferably three paint bottles 33 are included to allow for a variety of uses and colors. In the second row of the package, a plurality of stacked plates 32 are positioned in the center of the second row with the paint brushes 35, one for each plate, positioned on either side of the plates. Plates 32 are stacked for efficient use of space. In the third row of the package, background media 34, such as poster board, is positioned. Packages can be made to either include or exclude the poster board as is desired for efficient shelf space usage and different product offerings. The background material could also be positioned between the paint bottles 33, reservoirs 32, protective cover 31 and paint brushes and the backing piece 38. This would help minimize the size of the package.

FIG. 5 shows an exploded view of the materials in the package 40 which forms the kit. Plastic cover 39 is attached to backing piece 38 at its curved periphery 42. Periphery portion 42 lays flat against backing piece 38 for a secure attachment.

FIG. 6 shows the same package as FIG. 5 with the poster board excluded. This allows the package to take up less shelf space, and provides an alternative to the full complement package.

The package could take different forms if desired, such as being enclosed in a brief-case type structure for portability and ease of repeated use.

By practicing the inventive method set forth above, the user can create an attractive remembrance of a baby, which also doubles as a painting which warrants life-long display. The result is a unique, intriguing product that is virtually unidentifiable as being a remembrance of a baby. The kit created to support the practice of the method of the present invention includes all the material required for practicing the method in a convenient, cost-effective, and space efficient package.

Although the present invention has been described with a degree of particularity, it is understood that the present disclosure has been made by way of example, and changes in detail or structure may be made without departing from the spirit of the invention, as defined in the appended claims.

I claim:

1. A method of painting on a work surface using the posterior of an infant said method comprising the acts of:

preparing a protective covering on the work surface;

preparing the background media by placing it on said protective covering on the work surface;

placing a reservoir on said protective covering;

filling the reservoir with a paint;

dipping the posterior of the infant in said paint; and stamping the posterior on said background media to create stamping prints.

2. A method as defined in claim 1, wherein:

said dipping and said stamping steps are repeated in sequence.

3. A method as defined in claim 1, further comprising the act of:

spraying a fixative agent on said background material to set said stamping prints.

4. A method as defined in claim 2, further comprising the act of:

spraying a fixative agent on said background material to set said stamping prints.

5. A method as defined in claim 1, wherein said filling step further comprises:

filling said reservoir with paint to a depth of between $\frac{1}{16}^{th}$ of an inch to $\frac{1}{8}^{th}$ th of an inch.

6. A method as defined in claim 1, wherein said filling step further comprises:

filling said reservoir with paint to a depth less than $\frac{1}{8}^{th}$ of an inch.

7. A method as defined in claim 1, wherein said filling step further comprises:

filling said reservoir with paint to a depth greater than $\frac{1}{16}$th of an inch.

8. A package kit containing articles for painting using the posterior of an infant, said package kit containing:

a flat, flexible backing piece;

a protective cover folded into a compact size attached to said backing piece;

a plurality of paint bottles attached to said backing piece;

a plurality of reservoirs attached to said backing piece;

a plurality of painting tools attached to said backing piece;

a plastic cover having a periphery, said plastic cover positioned over said protective cover, plurality of paint bottles, plurality of reservoirs, and plurality of paint brushes, and attached around its peripheral edge to said backing piece.

9. A kit as defined in claim 8, further comprising:

background media attached to said backing piece and under said cover.

10. A kit as defined in claim 8, wherein said painting tools are paint brushes.

11. A kit as defined in claim 8, wherein said painting tools are poly-brushes.

12. A kit as defined in claim 8, wherein said painting tools are a combination of poly-brushes and paint brushes.

13. A kit as defined in claim 8, wherein said plurality of reservoirs comprise a plurality of plates.

14. A kit as defined in claim 13, wherein said plates are stacked for efficiency space usage.

15. A kit as defined in claim 8, wherein:

said backing piece is partitioned into two rows, each row having a left, center and right portions; and wherein:

said protective cover is positioned in the left portion of said first row;

said plurality of paint bottles are positioned in said right portion of said first row;

said plurality of reservoirs are positioned in said center of said second row;

said plurality of painting tools are positioned partially on in the left portion and partially in the right portion of said second row.

16. A kit as defined in claim 15, further comprising:

a third row; and a background media positioned in said third row.

17. A kit as defined in claim 15, wherein said backing piece is rectangular.

* * * * *

US006022219C1

(12) EX PARTE REEXAMINATION CERTIFICATE (5469th)

United States Patent

Cohen

(10) Number: US 6,022,219 C1

(45) Certificate Issued: Aug. 8, 2006

(54) PAINTING KIT AND RELATED METHOD

(75) Inventor: Elise Cohen, 814 W. Bleeker, Unit C-3, Aspen, CO (US) 81611

(73) Assignee: Elise Cohen, Aspen, CO (US)

Reexamination Request:
No. 90/006,068, Aug. 20, 2001

Reexamination Certificate for:
Patent No.: 6,022,219
Issued: Feb. 8, 2000
Appl. No.: 09/216,638
Filed: Dec. 18, 1998

(51) Int. Cl.
*G09B 11/10* (2006.01)

(52) U.S. Cl. .......................................... 434/84; 434/81

(58) Field of Classification Search .................. 434/81, 434/84, 88, 96; 206/216, 223, 575, 576, 581
See application file for complete search history.

(56) References Cited

U.S. PATENT DOCUMENTS 1,901,861 A * 3/1933 Baker ......................... 312/231
3,334,003 A * 8/1967 Edwards ...................... 156/62
3,840,113 A * 10/1974 Bartleson .................... 206/575
4,266,666 A * 5/1981 Kuchenbecker ............. 206/461
5,186,499 A * 2/1993 Mason ........................ 283/81
5,353,929 A * 10/1994 Foster ........................ 206/364

OTHER PUBLICATIONS

"Handprint Apron," Family Fun Crafts. Copyright 1997 Disney Enterprises, Inc., p. 186.*
"Tulip Butts," BADART.COM. Steve Murmer, 1997. http://www.badart.com/tulipbutt.html.*

* cited by examiner

*Primary Examiner*—Kien Nguyen

(57) ABSTRACT

A unique painting process and an associated kit including the materials required for practicing the method. The method includes the acts of preparing a protective covering on a work surface, preparing a background media by placing it on the protective covering on the work surface, placing a reservoir on the protective covering, filling the reservoir with a paint, dipping the posterior of the infant in the paint, and stamping the posterior on the background media to create stamping prints. The kit of the present invention includes a flat, flexible backing piece, a protective cover folded into a compact size attached to the backing piece, a plurality of paint bottles attached to the backing piece, a plurality of reservoirs attached to the backing piece, a plurality of painting tools attached to the backing piece, and a plastic cover having a periphery, the plastic cover positioned over the protective cover, plurality of paint bottles, plurality of reservoirs, and plurality of paint brushes, and attached around its peripheral edge to the backing piece.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–15 are cancelled.

Claims 16 and 17 are determined to be patentable as amended.

New claim 18 is added and determined to be patentable.

16. A kit as defined in claim [15] *18*, further comprising:

a third row; and background media positioned in said third row.

17. A kit as defined in claim [15] *18*, wherein said backing piece is rectangular.

*18. A package kit containing articles for painting using the posterior of an infant, said package kit containing:*

*a flat, flexible backing piece partitioned into two rows, each row having a left, center and right portions;*

*a protective cover folded into a compact size, said protective cover attached to said backing piece and positioned in said left position of said first row;*

*a plurality of paint bottles attached to said backing piece and positioned in said right portion of said first row;*

*a plurality of reservoirs attached to said backing piece and positioned in said center of said second row;*

*a plurality of painting tools attached to said backing piece and positioned partially in the left portion and partially in the right portion of said second row; and*

*a plastic cover having a periphery, said plastic cover positioned over said protective cover, plurality of paint bottles, plurality of reservoirs, and*

*plurality of paint brushes, and attached around its peripheral edge to said backing piece.*

* * * * *